(12) United States Patent
Machida

(10) Patent No.: US 7,818,421 B2
(45) Date of Patent: Oct. 19, 2010

(54) AUTONOMOUS HANDLING MANAGEMENT SYSTEM, AUTONOMOUS HANDLING MANAGEMENT METHOD, AND PROGRAM

(75) Inventor: Fumio Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 226 days.

(21) Appl. No.: 11/922,789

(22) PCT Filed: Jun. 19, 2006

(86) PCT No.: PCT/JP2006/312232

§ 371 (c)(1),
(2), (4) Date: Dec. 21, 2007

(87) PCT Pub. No.: WO2006/137356

PCT Pub. Date: Dec. 28, 2006

(65) Prior Publication Data

US 2009/0037574 A1    Feb. 5, 2009

(30) Foreign Application Priority Data

Jun. 22, 2005   (JP) .............................. 2005-181659

(51) Int. Cl.
*G06F 15/13* (2006.01)
(52) U.S. Cl. .................. 709/224; 709/223; 709/225; 719/318; 705/7
(58) Field of Classification Search .............. 709/224, 709/225; 719/318; 705/7; 707/1
See application file for complete search history.

(56) References Cited

U.S. PATENT DOCUMENTS

| 5,951,609 | A | 9/1999 | Hanson et al. |
| 7,159,081 | B2 | 1/2007 | Suzuki |
| 7,424,717 | B2 * | 9/2008 | Blevins ....................... 719/318 |
| 2002/0111841 | A1 * | 8/2002 | Leymann et al. ............... 705/7 |
| 2004/0103173 | A1 | 5/2004 | Donatelli et al. |
| 2006/0112062 | A1 * | 5/2006 | Leymann et al. ............... 707/1 |

FOREIGN PATENT DOCUMENTS

| JP | 10-329800 | 12/1998 |
| JP | 2004-227359 A | 8/2004 |

OTHER PUBLICATIONS

C. Hagen, "Exception Handling in Workflow Management Systems," IEEE Transactions on Software Engineering, vol. 26:10, Oct. 2000, pp. 943-958.
J. Li et al., "Implementing Exception Handling Policies for Workflow Management System," Proceedings of the Tenth Asia-Pacific Software Engineering Conference (APSEC '03), IEEE 2003, pp. 564-573.

* cited by examiner

*Primary Examiner*—Jinsong Hu
(74) *Attorney, Agent, or Firm*—Foley & Lardner LLP

(57) ABSTRACT

An autonomous handling management system performing autonomously system handling management based on handling management policies. Determination means requests execution of workflow described in a handling management policy, and execution means executing the workflow detects, based on a stop determination rule, an abnormal state based on constraint not described in the policy description. Execution means, upon detecting the abnormal state, stops execution of workflow in accordance with the request from specific determination means or request on a specific control target, to thereby partially stop autonomous control and allows a debug operation to be efficiently executed by an administrator.

25 Claims, 17 Drawing Sheets

FIG. 16

| HANDLING MANAGEMENT POLICY RULE | | |
|---|---|---|
| IF ((APPLICATION LOAD = high) AND (SHARED SERVER = AVAILABLE)) THEN addhost1 (1); | | |
| IF ((APPLICATION LOAD = low) AND (SHARED SERVER = BUSY)) THEN remove (1); | | |
| ...... | | |

551

AUTONOMOUS HANDLING MANAGEMENT SYSTEM, AUTONOMOUS HANDLING MANAGEMENT METHOD, AND PROGRAM

This application is the National Phase of PCT/JP2006/312232, filed Jun. 19, 2006, which claims priority to Japanese Application No. 2005-181659, filed Jun. 22, 2005, the disclosure of which are hereby incorporated by reference in their entirety.

TECHNICAL FIELD

The present invention relates to an autonomous handling management system, autonomous handling management method, and program, which are particularly capable of partially stopping autonomous management upon performing autonomous control of a computer system.

BACKGROUND ART

There are increasing cases of introducing an autonomous handling management system into a distributed resource computer system. An autonomous handling management system automates complex management operations for a plurality of computer resources connected via a network. This autonomous handling management system monitors system monitor control targets, and automatically executes a handling procedure (hereinafter referred to as workflows) suitable for a system environment, based on preset handling rules (hereinafter referred to as policies). Patent Publication JP-2004-227359A1 describes a method of automatically continuing handling adapted to changes of a system environment in handling a storage system. Patent Publication JP-1998-329800A1 describes a method for achieving autonomous control of a spacecraft.

Conventional autonomous handling management systems described in Patent Publications as described above effectively function for intra-company system management or control of a spacecraft system. However, these autonomous handling management systems assume, as a requirement, a situation which allows acquirement of all necessary information when preparing policies, or no disagreement between workflows called by policies and equipped workflows which actually execute controls. Unless the requirement is satisfied, there is a case that a policy control is performed in a situation different from the intended situation or a workflow executes a control different from the intended control.

For example, consideration will now be taken into a situation that an intra-company system in a data center or a large enterprise is used, partially shared by a plurality of administrators and/or service handlers. Each administrator and handler requires autonomous management of the system so as to match business purposes and security requirements, based on their own handling management policies. In this situation, an administrator cannot always know all information about what controls are made by other administrators and what resources are allocated to other administrators. Workflows started by policies are not always matched with controls of the policies due to human errors and changes in system environments.

Therefore, there is a possibility that the requirements as described above are not satisfied in case of handling and managing of one system by a plurality of independent policy controls or in case of defining policies for a virtualized control targets. In these cases, a writer of a policy needs a mechanism for grasping mismatching between the policy control and the resulting effect thereof, in order to prevent such mismatching. Existing autonomous handling management systems have a purpose of automatically continuing handlings without human intermediation. Consequently, there is no mechanism for detecting mismatching between policy controls and resulting effects thereof and for notifying writers of the policies of detected mismatching, to enable mangers and the like to correct equipped policies or workflows.

A first problem in conventional autonomous handling management systems is that a system handled and managed by a plurality of autonomous control functions has no measure to cope with a case that an autonomous control function is caused, by another autonomous control function, to generate a control sequence not intended by writers of policies. This is because the reasons of occurring of the unintended control sequence cannot be analyzed in an environment in which control information of other autonomous controls cannot be grasped.

A second problem is as follows. Conventional systems perform autonomous controls using policies on the basis of virtualized or abstracted information or definitions of workflows. Such systems are not implemented with such a way to cope with a case that restrictions between information items which are omitted during virtualization or abstraction process of information incur a control result which is not intended by writers of policies. This is because the reason why an unintended control result incurred cannot be analyzed in an environment in which all information cannot be grasped due to virtualization or abstraction of information.

A third problem is that conventional systems are not implemented with a mechanism for checking an occurring problem and notifying writers of policies of the problem if an error is included in control scripts for individual resources which execute workflows or a control different from a control intended by writers of polices is loaded. This is because a policy writer writes a policy based on external specifications of a control script at the time when the policy is just being written. Consequently, the reasons why an unintended control result incurred cannot be analyzed if the operation environment of the control script varies or if there incurred mismatching between the external specifications and actual equipment.

DISCLOSURE OF THE INVENTION

In view of the problems of the conventional autonomous handling management systems as described above, it is an object of the present invention to provide an autonomous handling management system handled and managed by a plurality of autonomous control functions, method and program thereof, which are capable of determining a state that an autonomous control function causes another autonomous control function to incur occurrence of a control sequence not intended by policy writer, and capable of partially stopping an autonomous control function which involves a problem, and requesting a policy writer or a system administrator to cope with the problem.

It is another object of the present invention to provide an autonomous handling management system performing an autonomous control by use of a policy on the basis of virtualized or abstracted information or workflow definitions, method and program thereof, which are capable of determining a state that a control not intended by a policy writer is carried out by a restriction between pieces of information which have been lost in process of vitalizing or abstracting information, and capable of partially stopping an autonomous control function which incurs a problem, and requesting a policy writer or a system administrator to cope with the problem.

It is another object of the present invention to provide an autonomous handling management system, method and program thereof, which are capable of checking an occurring problem if a control script for respective resources to perform a workflow includes an error or if a control different from a control intended by a policy writer is equipped, and capable of partially stopping an autonomous control function which involves a problem, and of requesting a policy writer or a system administrator (each may be hereinafter collectively called an administrator sometimes) to cope with the problem.

It is another object of the present invention to provide a method and a program for use in the autonomous handling management system.

The present invention provides, in a first aspect thereof, an autonomous handling management system including: a state monitor section that monitors a state of a control target; a control determination section that determines a control, which is required for the control target, based on monitor information from the state monitor section and a handling management policy stored in a policy storage section; a control execution section that controls the control target based on a determination of the control determination section; a rule storage unit that stores therein a stop determination rule describing a stop condition for stopping an autonomous control of the control target; and stop determination means that detects satisfaction of the stop condition based on the monitor information and the stop determination rule, wherein: the stop determination means, upon detection of satisfaction of the stop condition, limits at least one of a control execution function of the control execution section and the monitor information to be supplied from the state monitor section to the control determination section.

The present invention provides, in a second aspect thereof, an autonomous handling management system that autonomously handles and manages a plurality of computers connected via a network, including: information collection means that collects monitor information of a control target in the system; control determination means that autonomously determines a control based on the monitor information collected by the information collection means and a handling management policy stored in a storage unit; control execution means that executes a control of the control target based on a control request from the control determination means; and stop determination means that determines whether or not an autonomous control is to be stopped, based on at least one of an execution state of the control executed by the control execution means and the monitor information collected by the information collection means, and based on the stop condition stored in the storage unit, wherein: the stop determination means, upon determining stop of the autonomous control, limits at least one of a control execution function of the control execution means and the monitor information to be supplied to the control determination means.

The present invention provides, in a third aspect thereof, an autonomous handling management method for autonomously handling and managing a system including a plurality of computers connected via a network, the method including the steps of: executing a workflow of a control in a control execution means based on monitor information obtained by a monitor device of the system and a handling management policy stored in a storage unit; upon executing the workflow of the control, detecting in the control execution means whether or not a stop condition is satisfied based on the monitor information and a stop determination rule which is stored in a storage unit; and upon detecting satisfaction of the stop condition, limiting in the control execution means at least one of a control execution function executed by the control execution means and the monitor information to be supplied from the monitor device to the control execution means.

The present invention provides, in a fourth aspect thereof, a program for a control computer which autonomously handles and manages a system including a plurality of computers connected via a network, the program allowing the control computer to operate the processings of: executing a workflow of a control based on monitor information obtained by a monitor device of the system and a handling management policy stored in a storage unit; upon executing the workflow of the control, detecting whether or not a stop condition is satisfied based on the monitor information and a stop determination rule which is stored in a storage unit and describes the stop condition for determining a stop of an autonomous control of a control target; and upon detecting satisfaction of the stop condition, liming at least one of an execution function of the workflow of the control and the monitor information to be supplied from the monitor device during the processing of executing the workflow of the control.

BRIEF DESCRIPTION OF THE DRAWINGS

FIG. 16 is a table showing an example of the handling management policy in the autonomous handling management system in FIG. 15.

BEST MODE FOR CARRYING OUT THE INVENTION

Figure 1:
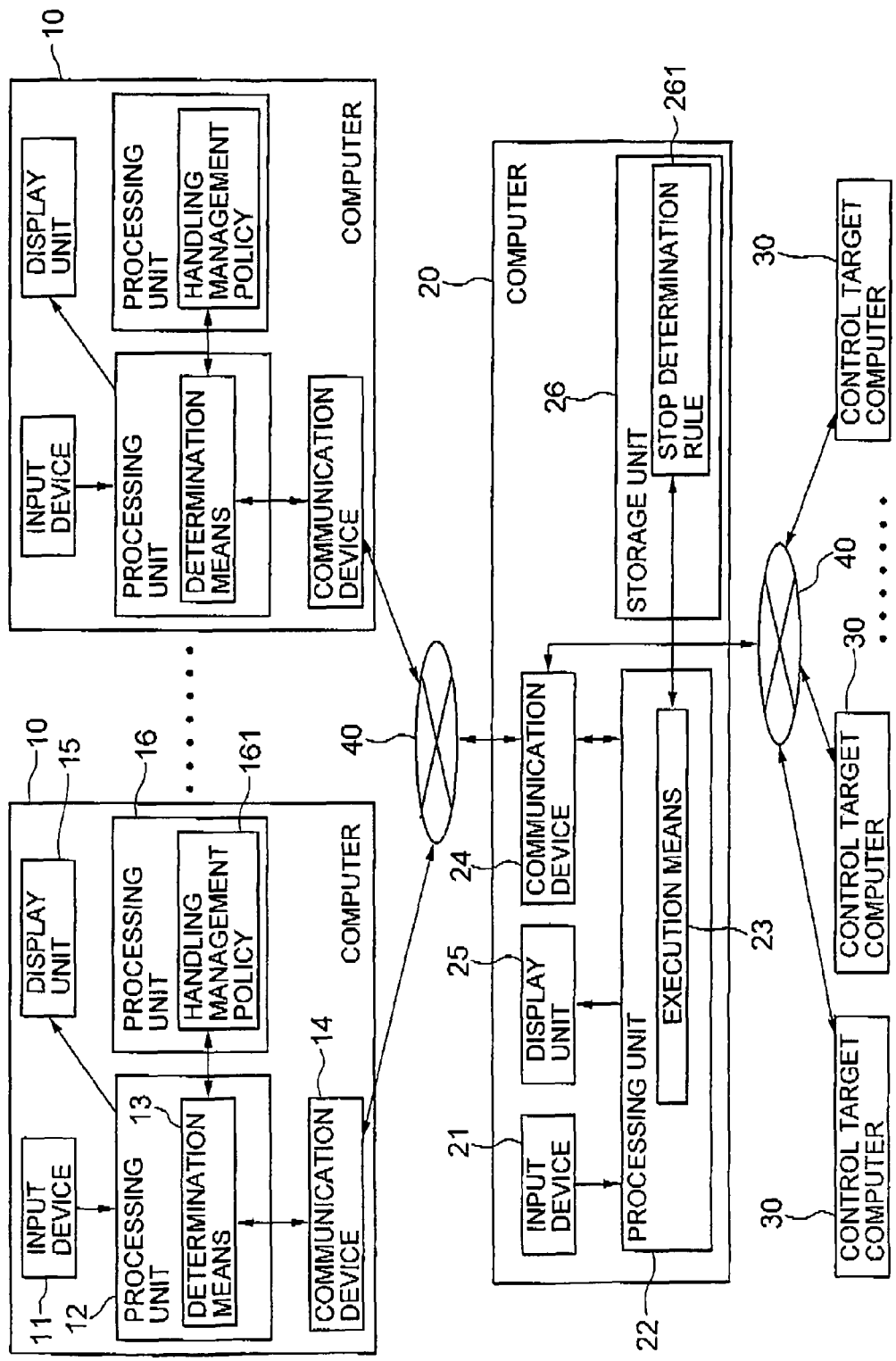
FIG. 1 is a block diagram showing the configuration of an autonomous handling management system according to a first embodiment of the present invention.

Next, the best mode for carrying out the invention will be described in detail with reference to the drawings. Referring to FIG. 1, an autonomous handling management system according to a first embodiment of the present invention is configured by: a plurality of computers 10 each having determination means for autonomous handling; a computer 20 having execution means (control execution means) for autonomous handling; a plurality of computers 30 as control targets; and a network 40 connecting these components.

The computers 10 each include: an input device 11 which receives input of data from a system handler or administrator; a display unit 15 which provides the system handler or administrator with information; a storage unit 16 which stores a handling management policy 161; a processing unit 12 including determination means 13 which autonomously starts up a workflow on the basis of the handling management policy; and a communication device (communication interface) 14 for communicating with the computer 20 via the network 40. The computer 20 includes: an input device 21 which receives input of data from the system handler or administrator; a display unit 25 which provides the system handler or administrator with information; a processing unit 22 having execution means (control execution means) 23 which interprets and executes requests from the determination means 13; a storage unit 26 which stores a stop determination rule 261; and a communication device 24 for communicating with the other computers 10 and 30 via the network 40. The computers 30 as control targets are configured as a plurality of computers which are controlled by the computer 20 via a network, to perform autonomous handling.

Figure 2:
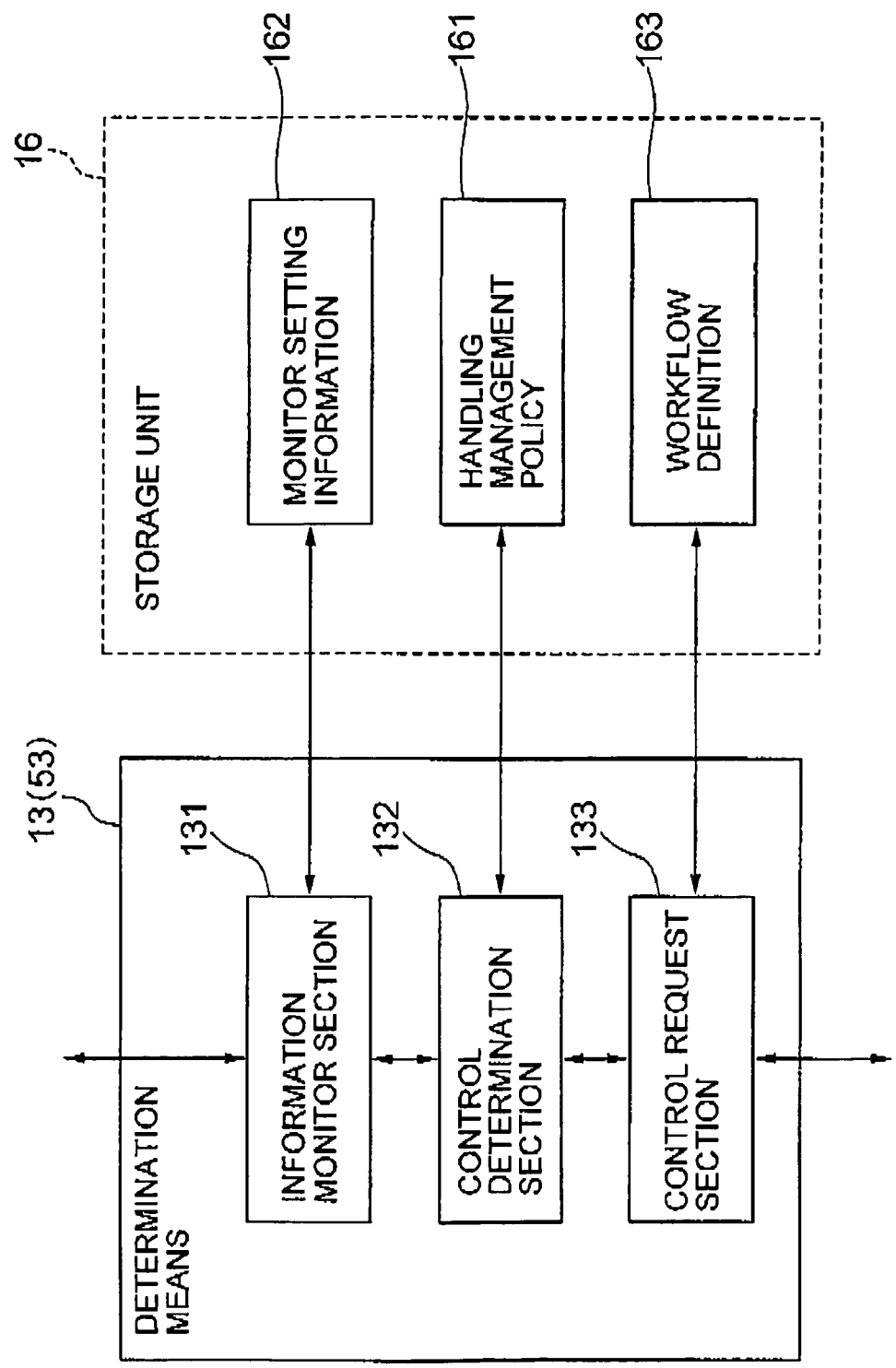
FIG. 2 is a block diagram showing the detailed configuration of determination means.

FIG. 2 shows detailed configurations of the determination means 13 and the storage unit 16 in each of the computers 10. The determination means 13 includes: an information monitor section 131 which monitors information relating to control targets and collected via a network; a control determination section 132 which starts up a workflow, based on monitor information and the handling management policy 161; and a control request section 133 which reads out a workflow definition 163 for preparing the workflow specified by the control determination section 132 and requests the execution means 23 to execute the workflow prepared from the workflow definition. The storage unit 16 stores therein monitor setting information 162 used by the information monitor section 131, the handling management policy 161 used by the control determination section 132, and the workflow definition 163 used by the control request section 133.

Figure 3:
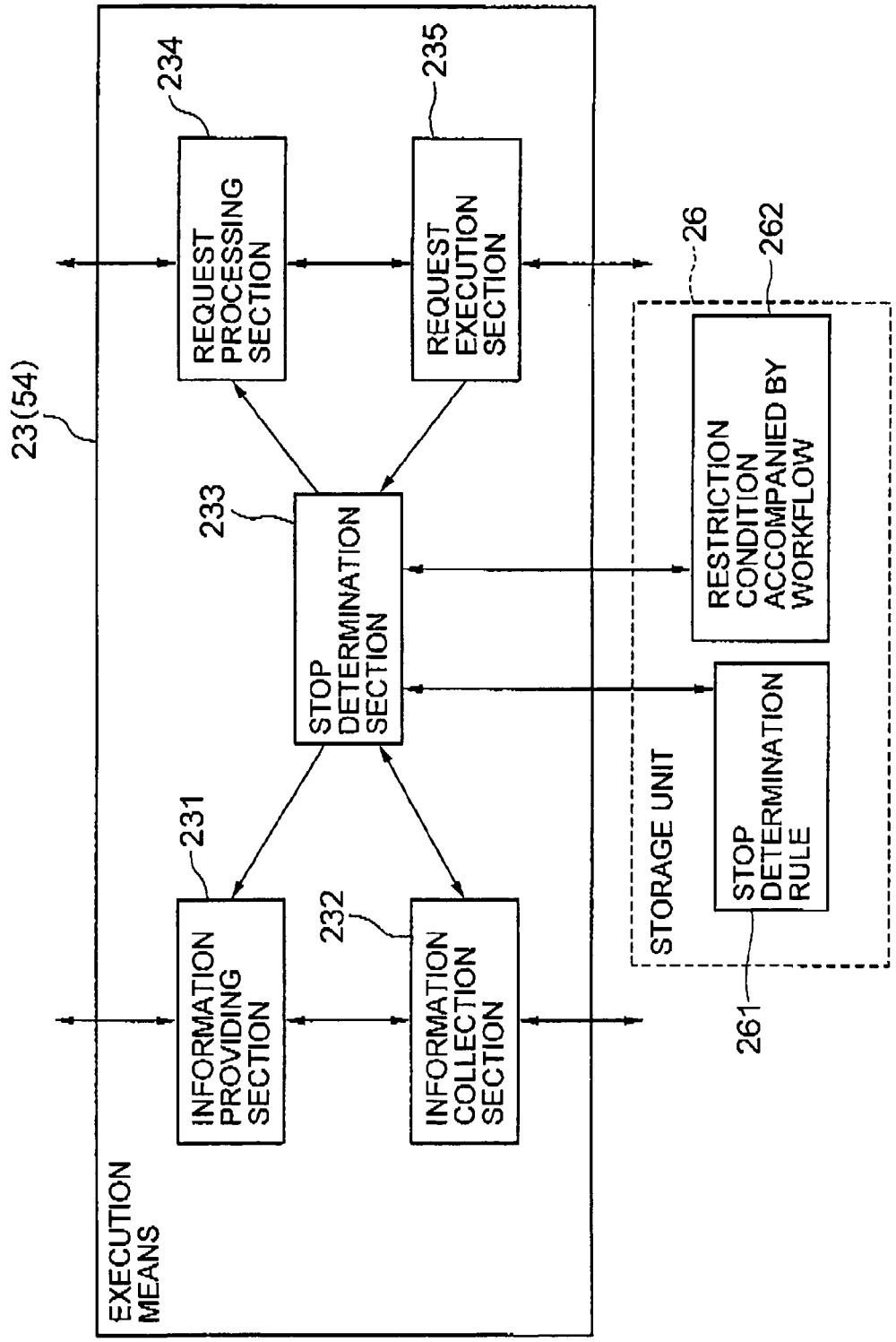
FIG. 3 is a block diagram showing the detailed configuration of execution means.

FIG. 3 is a block diagram showing the detailed configuration of the execution means 23 and storage unit 26 in the computer 20. The execution means 23 is configured by: a request processing section 234 which receives workflow execution requests from the determination means 13 of the a plurality of computers 10 via the network 40 and carries out adjustment; a request execution section 235 which performs control of each control target computer 30 via the network 40, the control being handed over from the request processing section 234; an information collection section (monitor device) 232 which collects information from each control target computer 30 via the network 40; an information providing section 231 which transforms and processes the information collected by the information collection section 232, and provides the a plurality of determination means 13 with the information through the network 40; and a stop determination section 233 which determines an autonomous control stop, depending on execution status information of controls handed over from the request execution section 235, the monitor information received from the information collection section 232, and the stop determination rule 261 read from the storage unit 26, and controls functions of the request processing section 234 and/or information providing section 231. The storage unit 26 stores therein a restriction condition 262 and a stop determination rule 261. The restriction condition 262 is accompanied by a workflow in order to allow the stop determination section 233 to start a monitor task in response to an execution status notification about a control. The stop determination rule 261 describes a stop procedure after checking the restriction condition 262.

The determination means 13 of the computers 10 monitors information of control targets via the execution means 23 of the computer 20, and autonomously determines a workflow on the basis of the handling management policy 161. The determination means 13 delivers a workflow execution request to the execution means 23. The execution means 23 which has received the workflow execution request accesses the computers 30 as control targets via the network 40, and performs control thereof. In addition, the execution means 23 collects load information, recovery information, and/or configuration information from the computers 30 as control targets. The execution means 23 transforms and processes such information, and then provides the determination means 13 with the information. The determination means 13 and the execution means 23 cooperate together to execute the controls continuously and autonomously.

Next, operation of the first embodiment will be described in detail. Firstly, handlers of applications or services, who request autonomous handling management, and/or network administrators and server administrators, who are entrusted to partial management of the system, prepare handling management policies for performing autonomous controls, based on handling management policies belonging to their own organizations. A handling management policy 161 and monitor setting information 162 are stored together with control programs into the storage unit 16 via the input device 11 of the computer 10.

Figure 4:
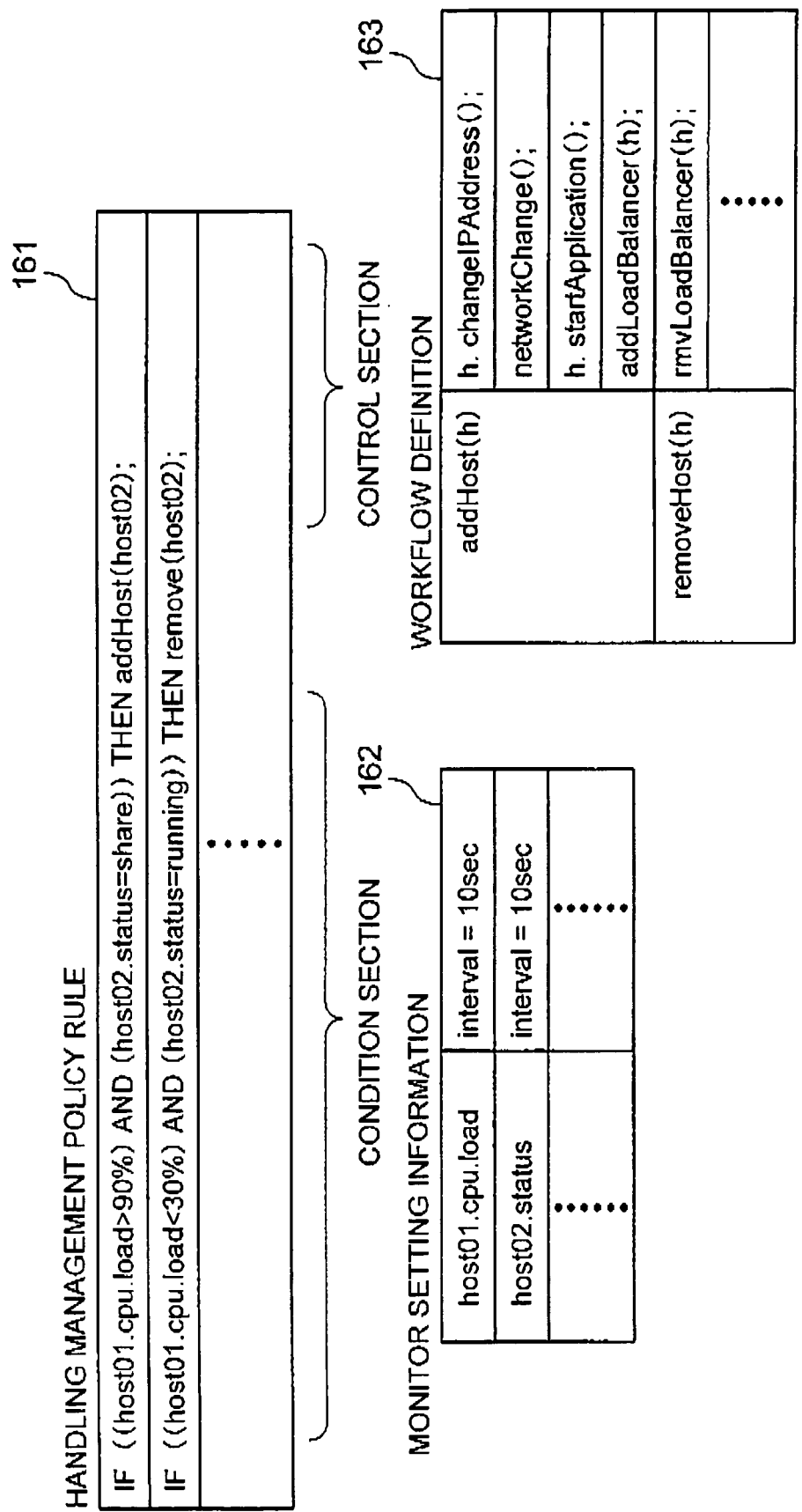
FIG. 4 is a table showing an example of the handling management policy, monitor setting information, and workflow definition.

FIG. 4 shows examples of the handling management policy 161, monitor setting information 162, and workflow definition section 163 which are stored in the storage unit 16. The handling management policy 161 includes at least a condition section and a control section, and is described in a rule format. Setting information for monitoring information which appears in the condition section of this rule is the monitor setting information 162, to set targets to be monitored and monitor time intervals. The monitor information is generated and provided by the execution means 23. Setting information for executing a workflow which appears in the control section of the rule is the workflow definition 163. The workflow definition 163 is used as a template for operation procedures of workflows. The execution means 23 transforms an obtained workflow into a detailed control procedure for controlling devices and then executes the procedure.

Next, a system administrator who is responsible to stably operate one data center or an enterprise system prepares a stop determination rule for stopping autonomous control functions and allowing the system administrator to mediate for analysis of problems. The stop determination rule 261 is stored into the storage unit 26 via the input device 21 of the computer 20.

Figure 5:
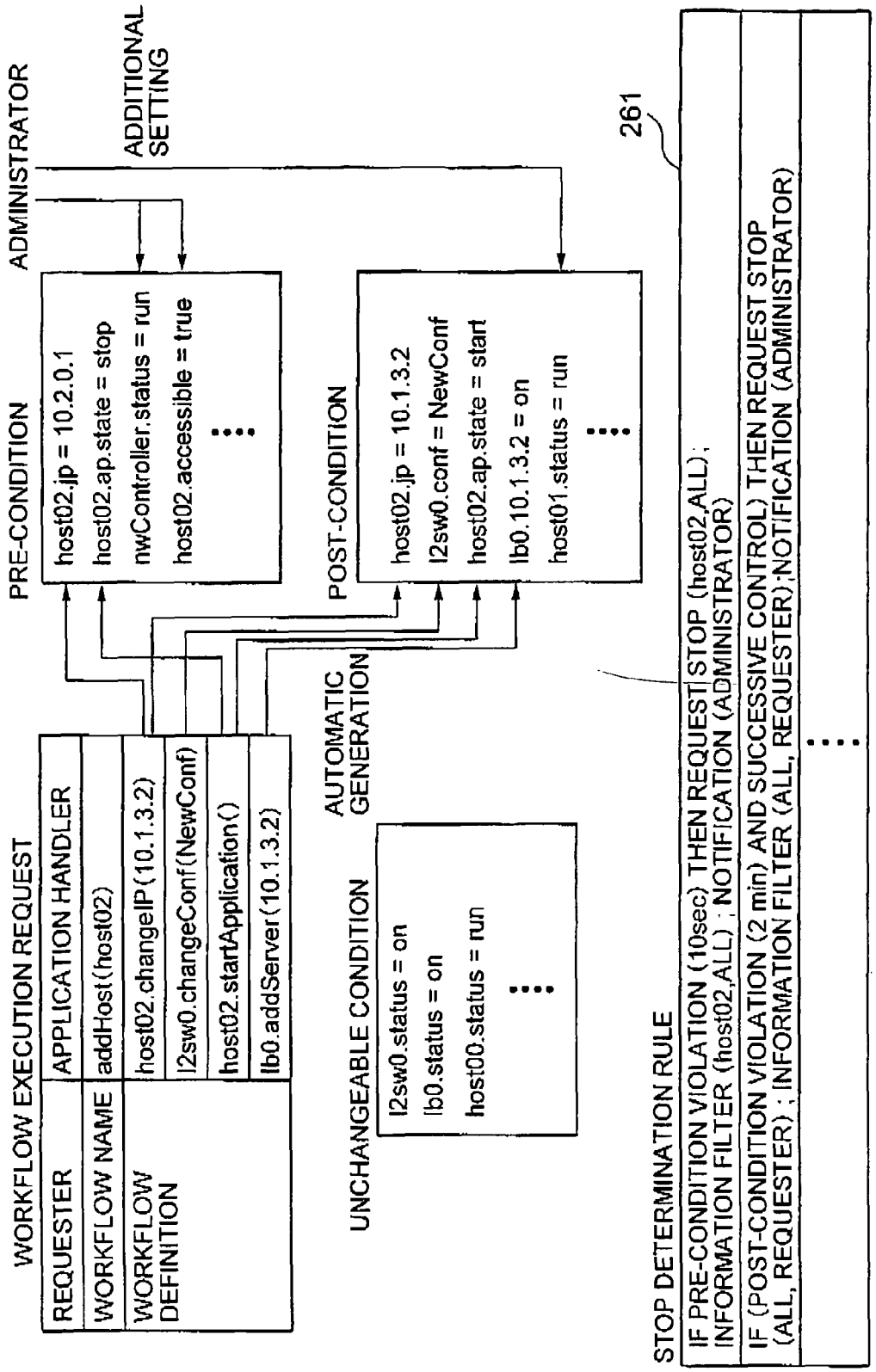
FIG. 5 is a table showing an example of the workflow definition, restriction condition, and stop determination rule.

FIG. 5 shows an example of the stop determination rule 261 and stop conditions included in the rule. The stop determination rule 261 is described by using pre-conditions and post-conditions which are accompanied by workflows or detailed control procedures, and an unchangeable rule which must be satisfied at the time of receiving whatever control request is.

Part of the pre- and post-conditions can be automatically generated from details of a handling management policy or details of workflows. Part other than the parts described above can be added by administrators. In the example of FIG. 5, an administrator adds, as a pre-condition, a condition that a program for controlling a network device is available. This condition is expressed as "nwController.status=run". The stop determination rule specifies which autonomous control is to be stopped if which of the foregoing conditions is violated at what timing. For example, the stop determination rule on the second line indicates that a stop procedure is executed if a post-condition is not satisfied upon elapse of two seconds regardless of successful completion of control after execution of a workflow. The stop procedure to be executed at this time provides an instruction to stop control requests for all resources from the requester (request stop (All, requester)), to stop providing all resource information for the requester (information filter (All, requester)), and to notify the administrator of the stop procedure having been carried out (Notify (administrator)).

Next, the determination means of the computer 10 and the execution means 23 of the computer 20 start handling, so that autonomous handling management is started based on the handling management policy 161. If there is no mismatching in the monitor information, handling management policy and workflow, and if controls from other autonomous control functions are not interfused, autonomous handling management can continuously be executed without human intermediation.

Figure 6:
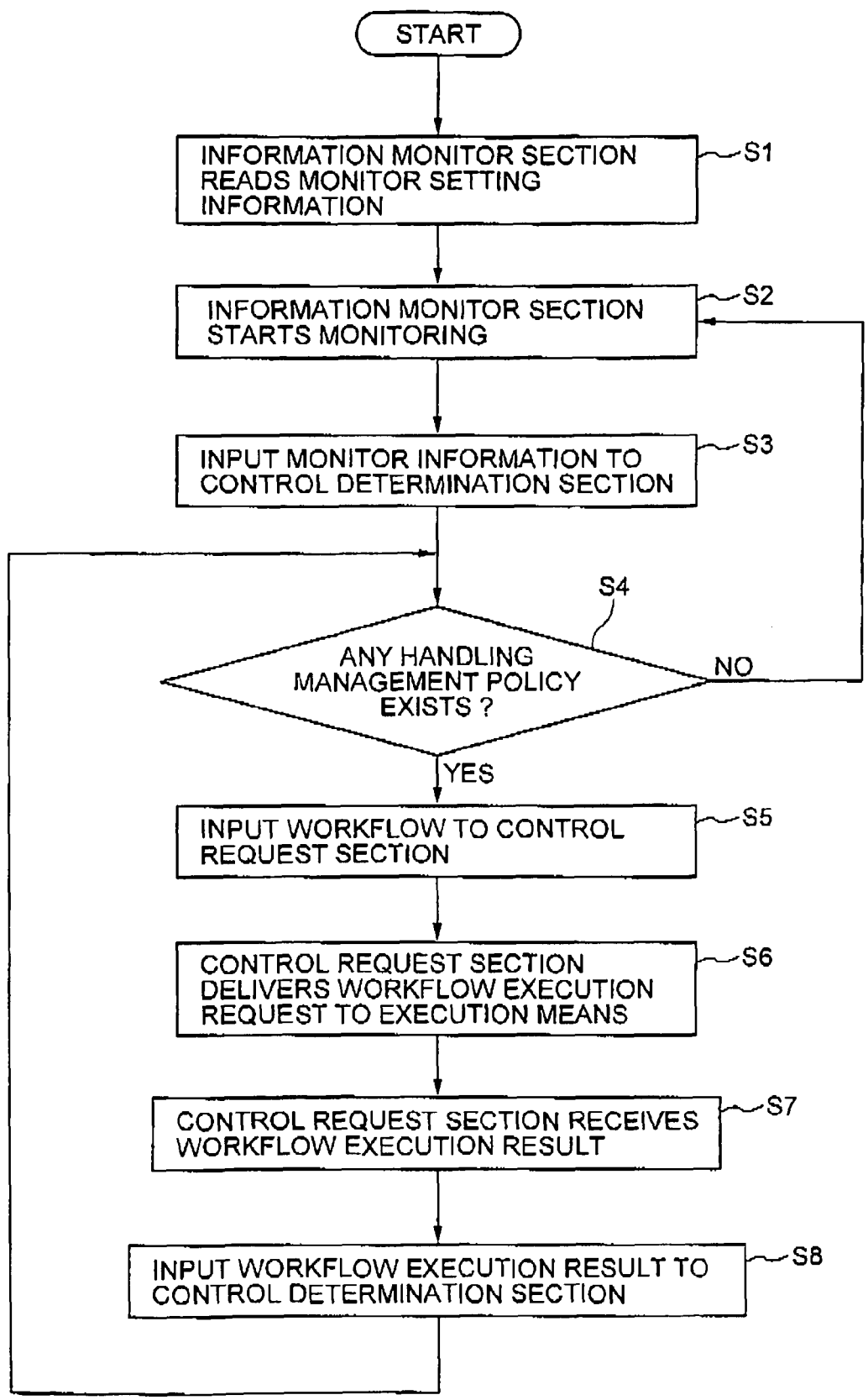
FIG. 6 is a flowchart showing a control loop in the determination means.

FIG. 6 is a flowchart showing a control loop in the determination means 13 in the computer 10. The information monitor section 131 reads monitor setting information 162 (step S1), and starts monitoring based on the information 162 (step S2). The information monitor section 131 inputs the monitor information to the control determination section 132 (step S3). The control determination section 132 compares the input monitor information and a workflow execution result from the control request section 133 against the handling management policy 161 stored in the storage unit 16, and determines whether there is a handling management policy which matches conditions or not (step S4). If, in step S4, there is a handling management policy which matches conditions, a workflow described in a control section of the policy is provided as input to the control request section 133 (step S5), and the process then advances to step S6. If there is no handling management policy which matches conditions, the procedure returns to the monitoring step S2 without carrying out anything. In step S6, the control request section 133 requests the execution means 23 to execute the workflow input from the control determination section 132, and receives an execution result (step S7). The execution result received from the execution means 23 is provided as input to the control determination section 132 (step S8), and then returns to step S4 to further monitor occurrence of a monitoring state which matches the handling management policy.

Figure 7:
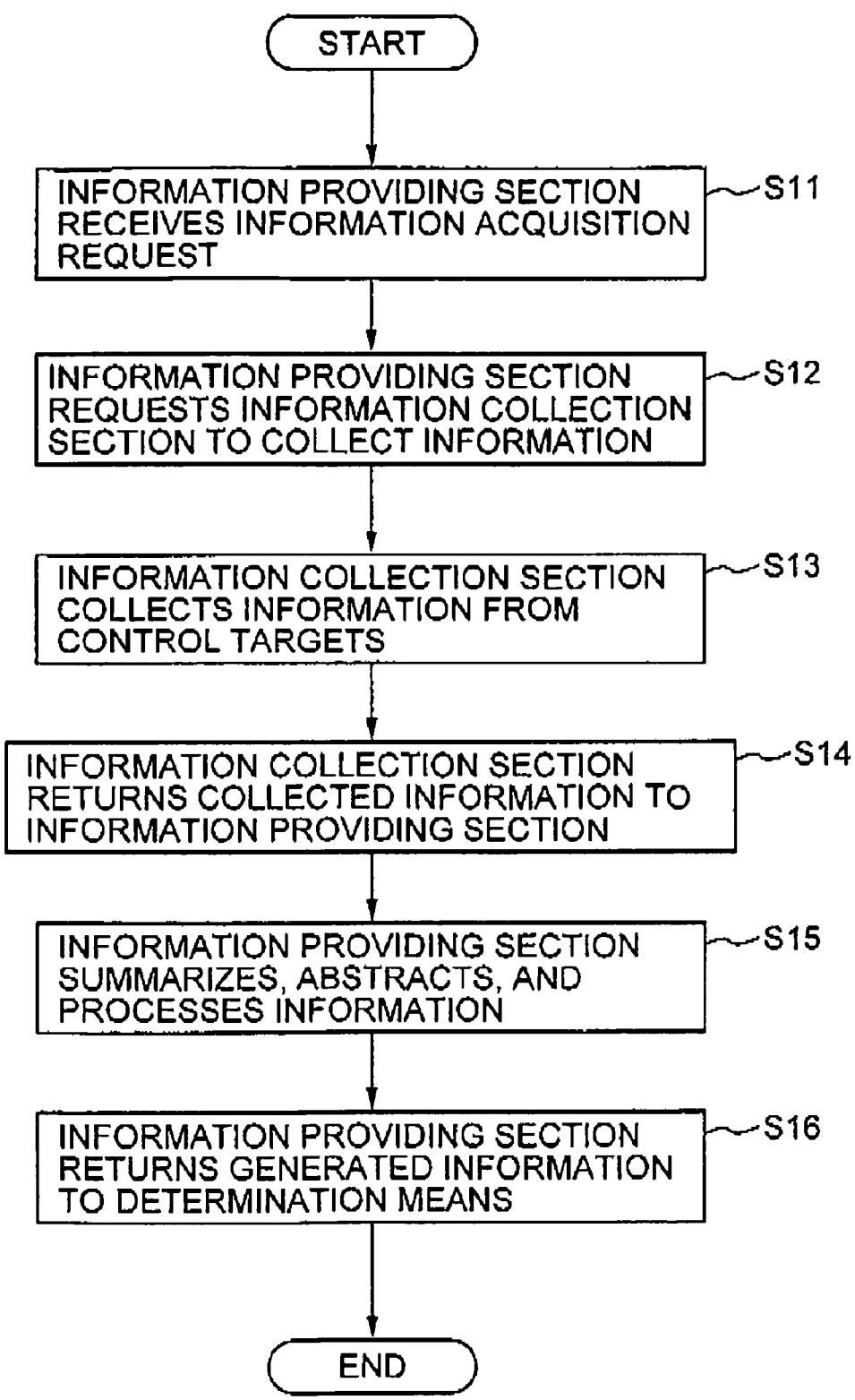
FIG. 7 is a flowchart showing the monitor information obtaining/providing processing of the execution means.

FIG. 7 is a flowchart showing a monitor information obtaining/providing processing of the execution means 23. When a request for obtaining monitor information is issued from the determination means 13 on the basis of the processing shown in FIG. 6, the information providing section 231 in the execution means 23 receives the request (step S11). The information providing section 231 checks rights of the determination means 13 as a requester and/or content of requested information, and issues a request for collecting information required for generating available information, to the information collection section 232 (step S12). The information collection section 232 collects requested information from a plurality of control targets (step S13), and returns the collected information to the information providing section 231 (step S14). The information providing section 231 processes and corrects content of the information if necessary (step S15), and returns monitor information as a result to the determination means 13 as an information requester (step S16).

Figure 8:
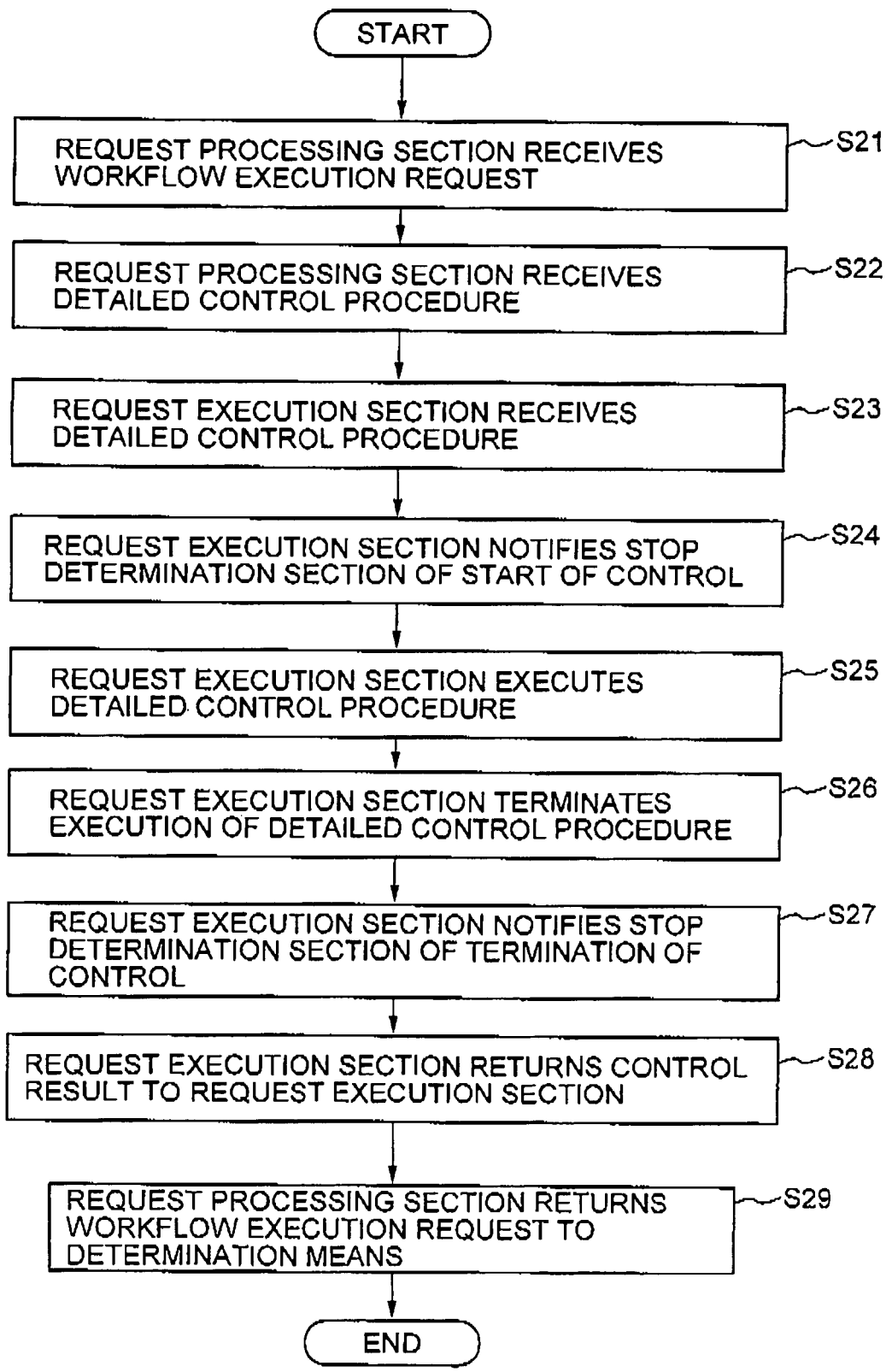
FIG. 8 is a flowchart showing the workflow execution processing of the execution means.

FIG. 8 is a flowchart showing a workflow execution processing of the execution means 23. When a workflow execution request is input from the determination means 13 on the basis of the processing shown in FIG. 6, the request processing section 234 in the execution means 23 receives the request. The request processing section 234 generates a detailed control procedure for executing the workflow execution request (step S22), and inputs the detailed control procedure to the request execution section 235 (step S23). The request execution section 235 notifies the stop determination section 233 of a start of a control before actually starting a control of control targets (step S24). Further, the request execution section 235 actually performs the control (step S25). After an end of the control (step S26), the request execution section 235 notifies the stop determination section 233 of the end of the control, before returning a control result to the request processing section 234 (step S27). The request processing section 234 receives a control result from the request execution section 235 (step S28), and returns the received control result as a workflow execution result to the determination means 13 (step S29).

The execution means 23 asynchronously receives monitor information acquisition requests and workflow execution requests from a plurality of determination means 13. Therefore, there is a case that a plurality of procedures for carrying out the same processing as each of the processing by the execution means 23 shown in FIGS. 7 and 8 are executed simultaneously. Next, a description will be made of operation when stopping an autonomous control function on the basis of a stop determination rule.

Figure 9:
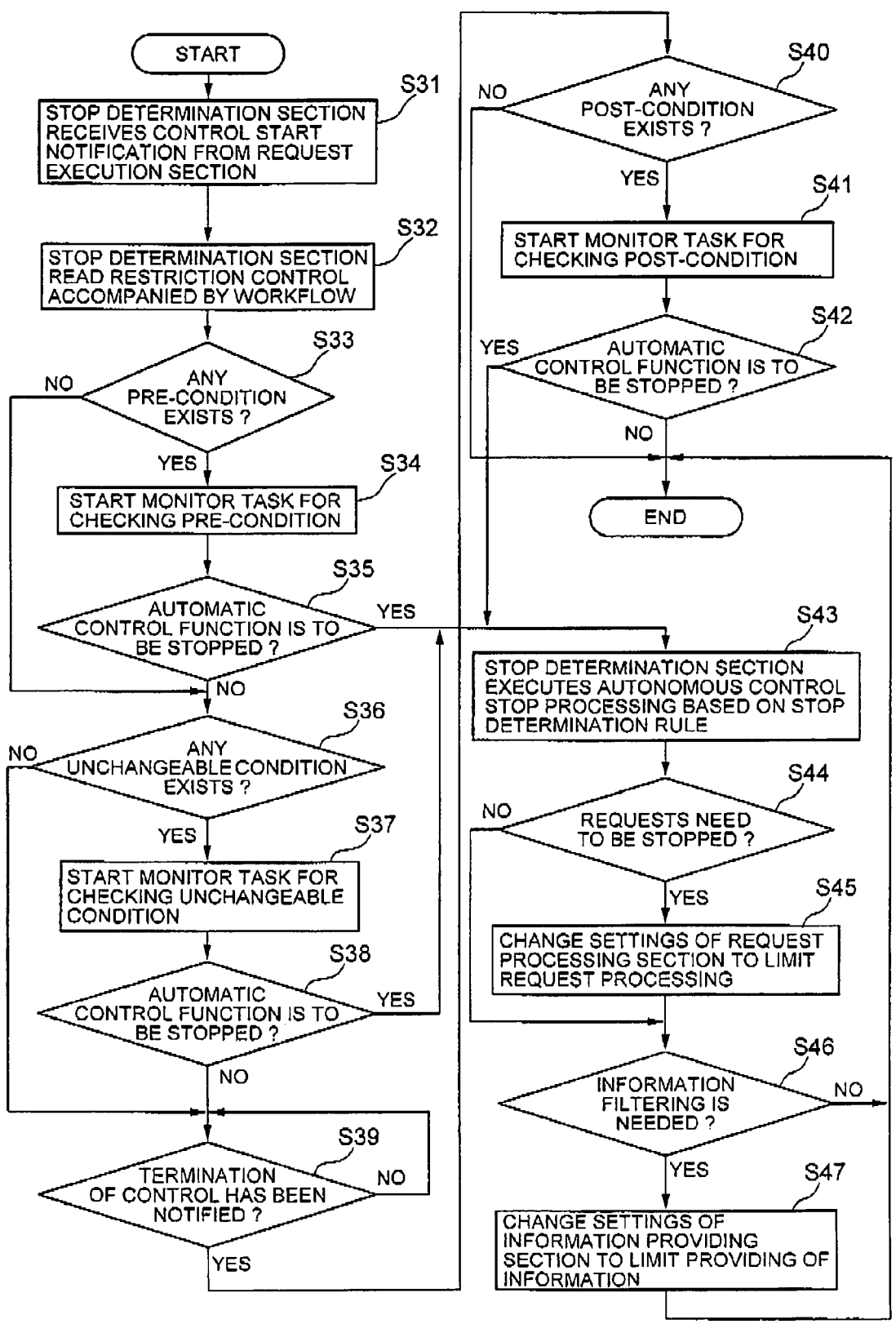
FIG. 9 is a flowchart showing the autonomous control step determination and stop processing of the execution means.

FIG. 9 is a flowchart showing an autonomous control stop processing of the execution means 23. Based on the processing shown in FIG. 8, the stop determination section 233 receives a control start notification from the request execution section 235 (step S31). The stop determination section 233 reads a restriction condition accompanied by a workflow, control of which is to be started (step S32). At first, the stop processing checks whether or not a pre-condition to be satisfied has been defined before executing the workflow (step S33). If a pre-condition has been defined, a monitor task for checking the pre-condition is started (step S34). Subsequently, whether or not the autonomous control function is to be stopped is determined based on a stop determination rule (step S35). If it is determined in step S35 that the autonomous control function is to be stopped, the process advances to a common autonomous control stop processing flow which starts from step S43. If the autonomous control function need not be stopped, the process advances to step S36 to further check presence or absence of an unchangeable condition. The unchangeable condition describes a condition to be satisfied during a workflow. The unchangeable condition is kept checked until a control end notification is provided (steps S37 and S38). If it is determined that the autonomous control function is to be stopped, based on the stop determination rule, the process advances to the common autonomous control stop processing flow which starts from step S43. If it is determined that the autonomous control function need not be stopped and if a control end notification is further provided from the request execution section 235 (step S39), presence or absence of a post-condition is determined (step S40). If a post-condition has been specified, a monitor task for checking the post-condition is started (step S41). Whether or not a stop is needed is determined based on the post-condition, and if a stop is needed, the process advances to a common autonomous control stop processing which starts from step S43. If a stop is not needed, the series of processing end, and the autonomous handling management system continues autonomous control.

If it is determined that the autonomous control function is to be stopped on the basis of a described stop determination rule in any of the condition checks described above (steps S35, S38, and S42), the process advances to the common autonomous control stop processing flow which starts from step S43. If the autonomous control function need not be stopped, the processing is terminated. The autonomous control stop processing is carried out based on a method described in the stop determination rule. If the stop determination rule includes a description stating that requests from a particular determination means 13 or to a particular control target shall be stopped, the stop determination section 233 changes settings of the request processing section 234 and limits a request processing function. If the stop determination rule includes a description stating that providing of monitor information shall be limited for a particular determination means 13 or providing of information shall be limited for a particular control target, the stop determination section 233 changes settings of the information providing section 231 and limits an information providing function.

In the autonomous handling management system of the embodiment, the stop determination section 233 terminates the processing after completion of all the stop processings described in the stop determination rule. These stop processings are not to stop autonomous control upon direct requests from the stop determination section 233 and the determination means 13 and are to partially stop an autonomous control function by limiting the request processing function and the information providing function. Information of such a stop is notified to the administrator of the calculation system. The configuration of the system is therefore not changed by an erroneous determination of the determination means 13, and accordingly, a recovery work carried out by the administrator becomes efficient.

Figure 10:
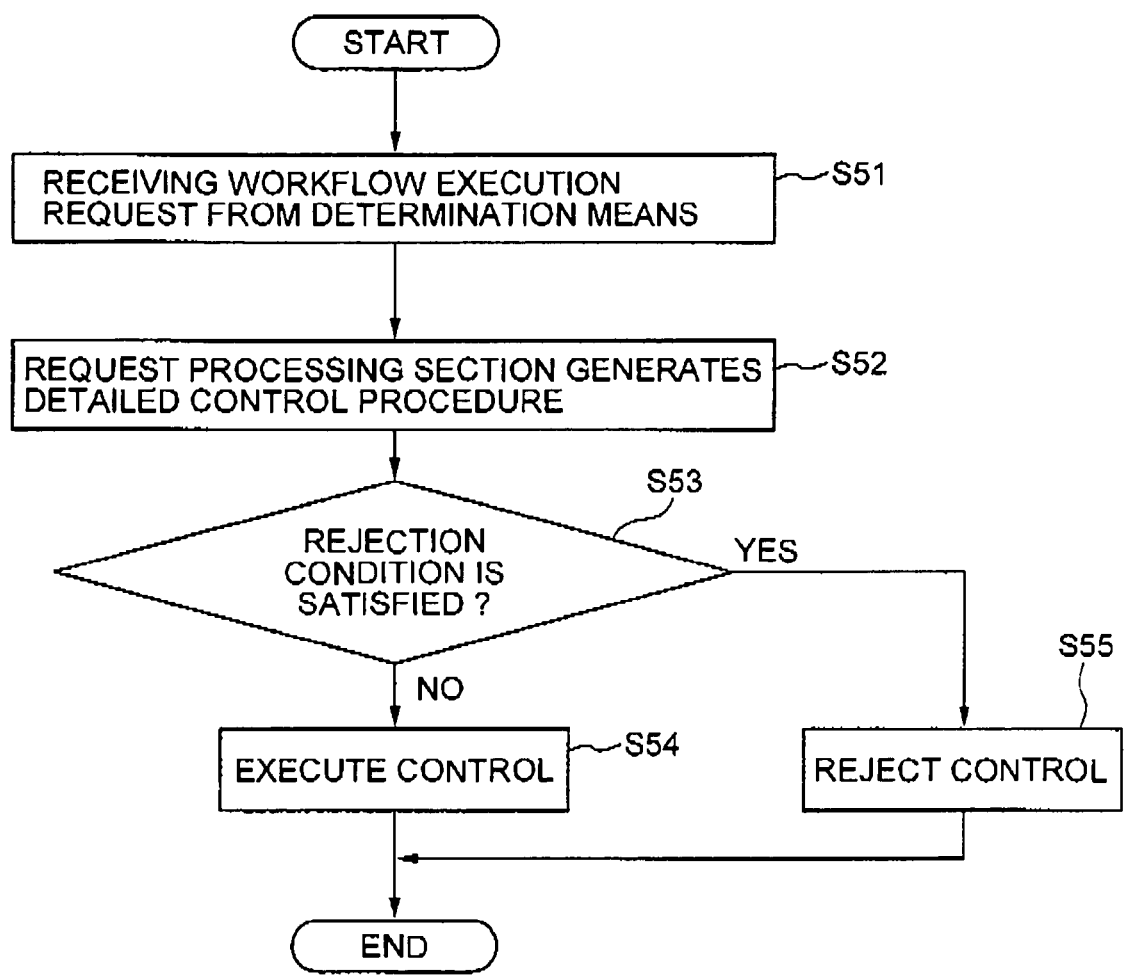
FIG. 10 is a flowchart showing the operation of a request processing section for which the stop setting for stopping the autonomous control has been set by the stop determination section.

Described next will be operation of restricting the control function of the determination means 13 by means of the request processing section 234. FIG. 10 is a flowchart showing operation of the request processing section 234 for which a stop setting has been carried out by the stop determination section 233. Upon reception of a workflow execution request from the determination means 13 (step S51), the request processing section 234 then generates a detailed control procedure (step S52). Subsequently, the request processing section 234 checks whether or not a processing based on the control procedure complies with a rejection condition which has been set by the stop determination section 233 (step S53). In case of a control request from a rejected determination means 13 or including a processing on a rejected control target, this workflow execution request is rejected (step S55), and the processing is terminated. If the processing based on the control procedure is not such a processing, the generated control procedure is executed (step S54).

Figure 11:
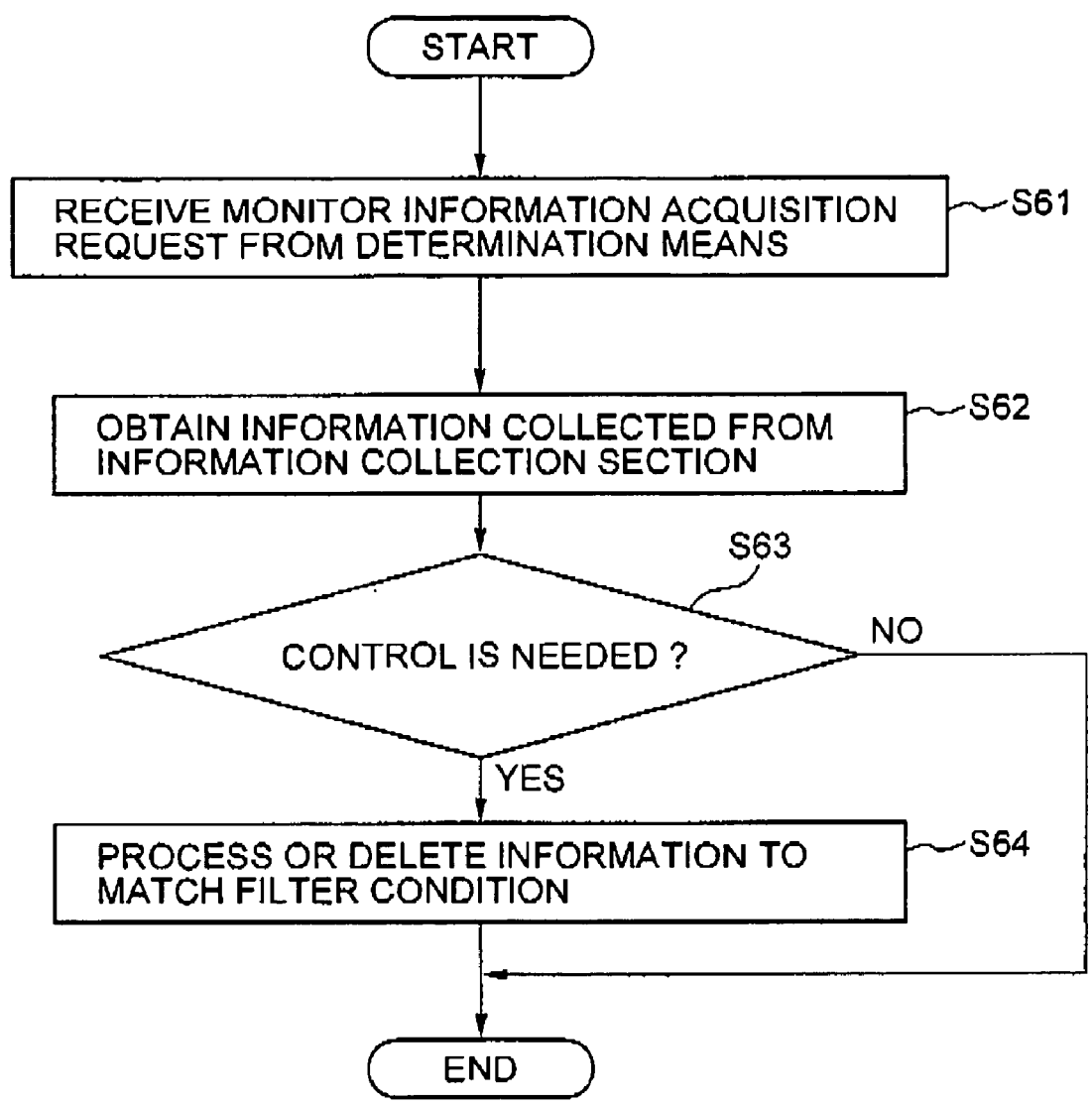
FIG. 11 is a flowchart showing operation of the information providing section for which the stop setting for stopping the autonomous control has been set by the stop determination section.

Described next will be operation of restricting the control function of the determination means 13 by means of the information providing section 231. FIG. 11 is a flowchart showing operation of the information providing section 231 for which a stop setting has been carried out by the stop determination section 233. After receiving a monitor information acquisition request from the determination means 13, the information providing section 231 obtains information of control targets from the information collection section 232. The filter condition set by the stop determination section 233 is then checked. In case of a request from determination means 13 for which providing of information is limited or in case of including information of a control target for which providing of information is limited, the information is deleted. Alternatively, information to be provided is generated by adding information indicating unavailability. In this manner, source information which causes the determination means 13 to make an erroneous determination is shielded. Accordingly, an erroneous system configuration is prevented in advance, so that a recovery work carried out by the administrator becomes efficient.

In the above embodiment, problems related to system management which are hardly revealed due to autonomous control systems can be discovered in an early stage. After discovery, a problematic part is narrowed by partially stopping the autonomous control function. Thus, the administrator is allowed to easily reconsider and revise recovery works and handling management policies.

Figure 12:
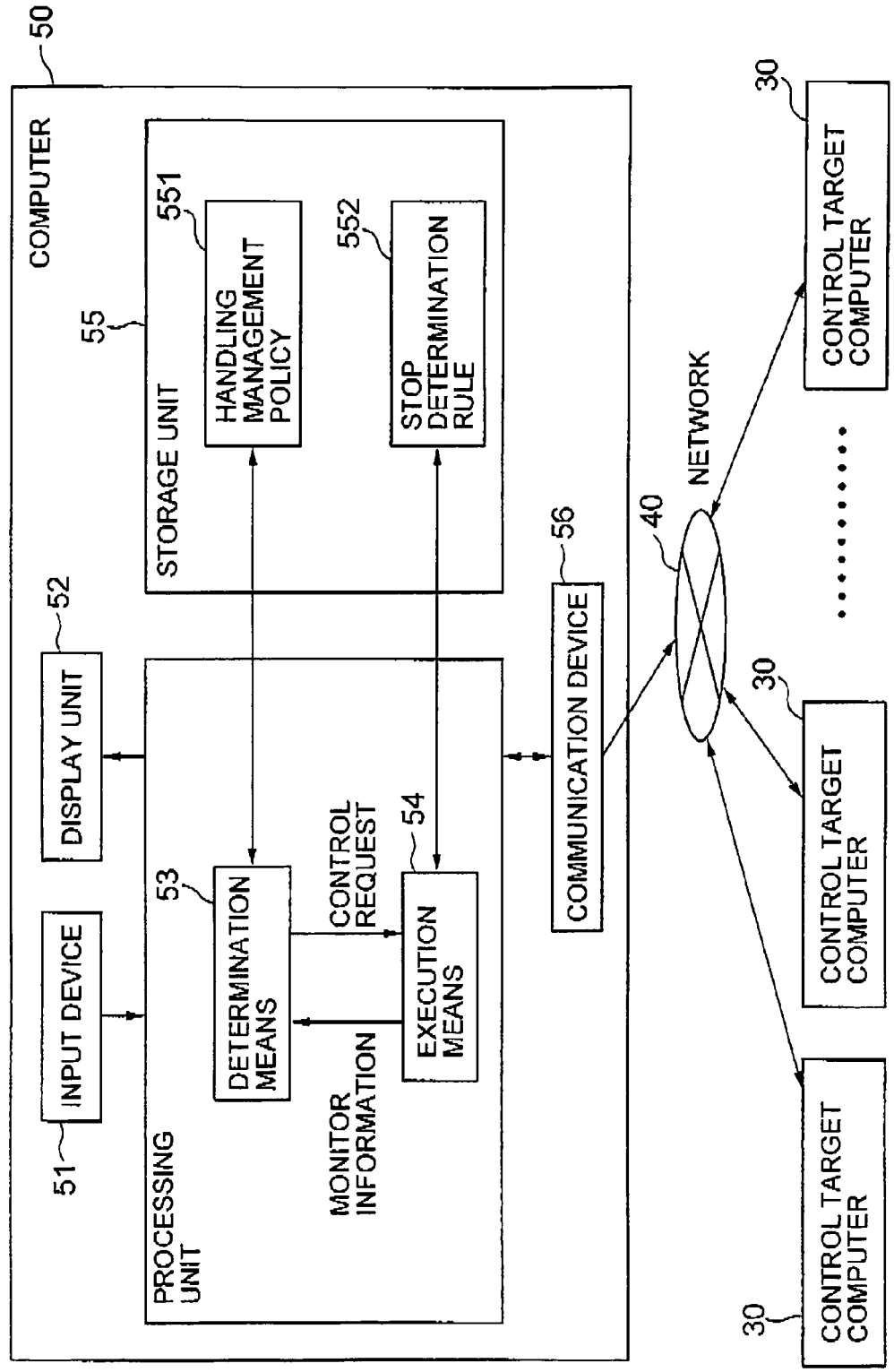
FIG. 12 is a block diagram showing the configuration of an autonomous handling management system according to a second embodiment of the present invention.

Next, a second embodiment of the present invention will be described with reference to the drawings. FIG. 12 shows an autonomous handling management system according to the second embodiment. A difference from the first embodiment is that determination means and execution means operate on the same computer. The features of the configuration other than the difference are the similar to those shown in FIG. 1. The autonomous handling management system is configured by: a computer 50 having determination means and execution means; a plurality of computers 30 as control targets; and a network 40 connecting these components. The configurations of the determination means 53 and the execution means 54 in the present embodiment are similar to those of the determination means 13 and the execution means 23 shown in FIGS. 2 and 3. The determination means 53 determines what autonomous control the system should perform, referring to a handling management policy 551 stored in a storage unit 55. The execution means 54 determines whether or not autonomous control is to be stopped, based on a stop determination rule 552 stored in the storage unit 55.

Next, operation of the present embodiment will be described. At first, the handling management policy 551 for handling a service and the stop determination rule 552 for stopping autonomous handling for allowing human work to mediate are stored into the storage unit 55 via the input device 51. The execution means 54 executes an abstracted, summarized, and virtualized workflow (hereinafter referred to as an abstracted workflow), referring to abstracted, summarized, and virtualized information (hereinafter referred to as abstracted information) so that the service handling management policy 551 can cope with as much situation determination as possible with less descriptions. The execution means 54 expands the abstracted workflow into a detailed control procedure, and executes the control procedure. The execution means 54 further generates abstracted information from information collected from control targets, and provides the determination means 53 with the information.

Autonomous handling management based on a handling management policy is started by starting handling of the determination means 53 and the execution means 54. Unless mismatching in the monitor information, handling management policy, and control program, the autonomous handling management continues.

A control loop in the determination means 53 is shown in the flowchart of FIG. 6. Monitor information providing processing in the execution means is shown in the flowchart of FIG. 7. Information provided for the determination means 53 by this processing includes abstracted information. A workflow execution processing in the execution means 54 is shown in the flowchart of FIG. 8. The workflow requested by the determination means includes an abstracted workflow.

Described next will be operation of stopping an autonomous control function on the basis of a stop determination rule. An autonomous control stop processing in the execution means 53 shown in the flowchart of FIG. 9. A restriction condition accompanied by a workflow includes information before being abstracted. In the stop determination section 233, the stop determination rule 552 specifies detailed conditions to compensate for conditions which are too abstracted to check.

Described next will be operation of restricting the control function of the determination means 53 by means of the request processing section 234. Operation of the request processing section 234 for which a stop setting has been carried out is shown in the flowchart of FIG. 10. An abstracted workflow is expanded into a detailed control procedure by the request processing section 234 (step S52), and whether a rejection condition is violated or not by actually performing control is checked (step S53).

Described next will be operation of restricting the control function of the determination means 13 by means of the information providing section 231. Operation of the information providing section 231 for which a stop setting has been carried out by the stop determination section 233 is shown in the flowchart of FIG. 11. Whether or not abstracted information includes information which satisfies a rejection condition is checked (step S63).

In the present embodiment, an abnormal state which cannot be determined based on only abstracted and summarized information is detected. A part of the autonomous control function, which is related to a problematic part is stopped. In this manner, the administrator is easily allowed to improve the handling management policy and control program.

In the autonomous handling management system, autonomous handling management method, and program of the present invention, due to the configuration which limits at least one of a control execution function of the execution means of a workflow and monitor information supplied to the execution means of a workflow from the monitor device (information collection means), even if a control stop condition is satisfied, the autonomous control operation can be indirectly stopped without directly operating the control decision function which decides a workflow for a control from monitor information of the control execution means and the handling management policy. Therefore, if a control sequence which is not intended by a policy writer occurs, a cause analysis is available for the policy writer.

In the present invention, the stop determination rule is allowed to include a control state caused by a control of another execution means or information which is neither abstracted nor generally included in the handling management policy. Therefore, presence or absence of a stop condition which cannot be determined by the handling management policy can be monitored. By limiting the function of the execution means or by limiting monitor information supplied from the monitor device to the execution decision function of the execution means, the autonomous control function can be stopped without implementing the control decision function of the execution means with a complex control.

The foregoing "limitation" to the execution function and monitor information refers to a stop of at least one of the execution function and monitor information. In addition, the phrase "execution state of a control" particularly refers to a state of the system which can be determined by obvious information within the system, independently from monitor information from the information collection means, e.g., a state before or after start of a workflow of a control. Information of such a state is supplied as monitor information from the monitor device to the stop determination means. The "restriction to setting information depending on devices" refers to a restriction which is issued by adding a particular setting to a device existing in the system because of a specialty of the device. A restriction of this kind does not fit a policy which should be generalized and abstracted, and is therefore preferably added, together with stop conditions particularly required for individuals work processing, to the stop determination rule.

The stop determination means or execution means preferably issues an alarm to the system administrator after the stop condition is satisfied. In this case, a cause analysis by the administrator is enabled on a control state which is not intended.

The stop condition can include restrictions, such as information which is maintained confidential and cannot be described in the handling management policy, and setting information depending on a device existing in the system. In this case, the information which cannot be described in the handling management policy and special information which should not be described in the handling management policy can be included into the stop condition. As a result, control is enabled by using only a generalized and abstracted handling management policy.

The stop condition can include a case that an effect of executing a control script, which is supposed by the handling management policy, is different from the actual effect of executing the control script. In this case, a problem in autonomous control can be discovered rapidly.

When the stop determination means determines an autonomous control stop as described previously, it is possible to stop all the monitor information provided from the information collection means to the control determination means, or to stop providing of a part of the monitor information provided from the information collection means to the control determination means. Alternatively, the monitor information provided from the information collection means to the control determination means can be provided, with the monitor information added with information indicating a target, control of which should be stopped. Then, a stop state which matches the system configuration or a desired stop state of the autonomous control can be obtained.

At least a part of the stop determination means can be realized by a monitor task which is started up depending on an execution state of a workflow. In this case, whether a stop condition is satisfied or not can be determined.

When executing a workflow of a control on the basis of a monitor state, the control execution means preferably checks that at least one of a pre-condition defined for the workflow and a determination condition utilized when the control is determined by the handling management policy is satisfied, prior to execution of the workflow. In this case, the autonomous control can be stopped by a special stop condition, without correcting a generalized and abstracted handling management policy. Further, a situation can be avoided that a control which is unsuitable for a system handler is carried out by a handling management policy of another system handler.

After a workflow of a control is executed based on a change of a monitor state, the stop determination means preferably determines whether or not a post-condition defined in the workflow is satisfied. In this case, rapid discovery is available of a case that a control which is unsuitable for a system handler is carried out by a handling management policy of another system handler.

EXAMPLES

Figure 13:
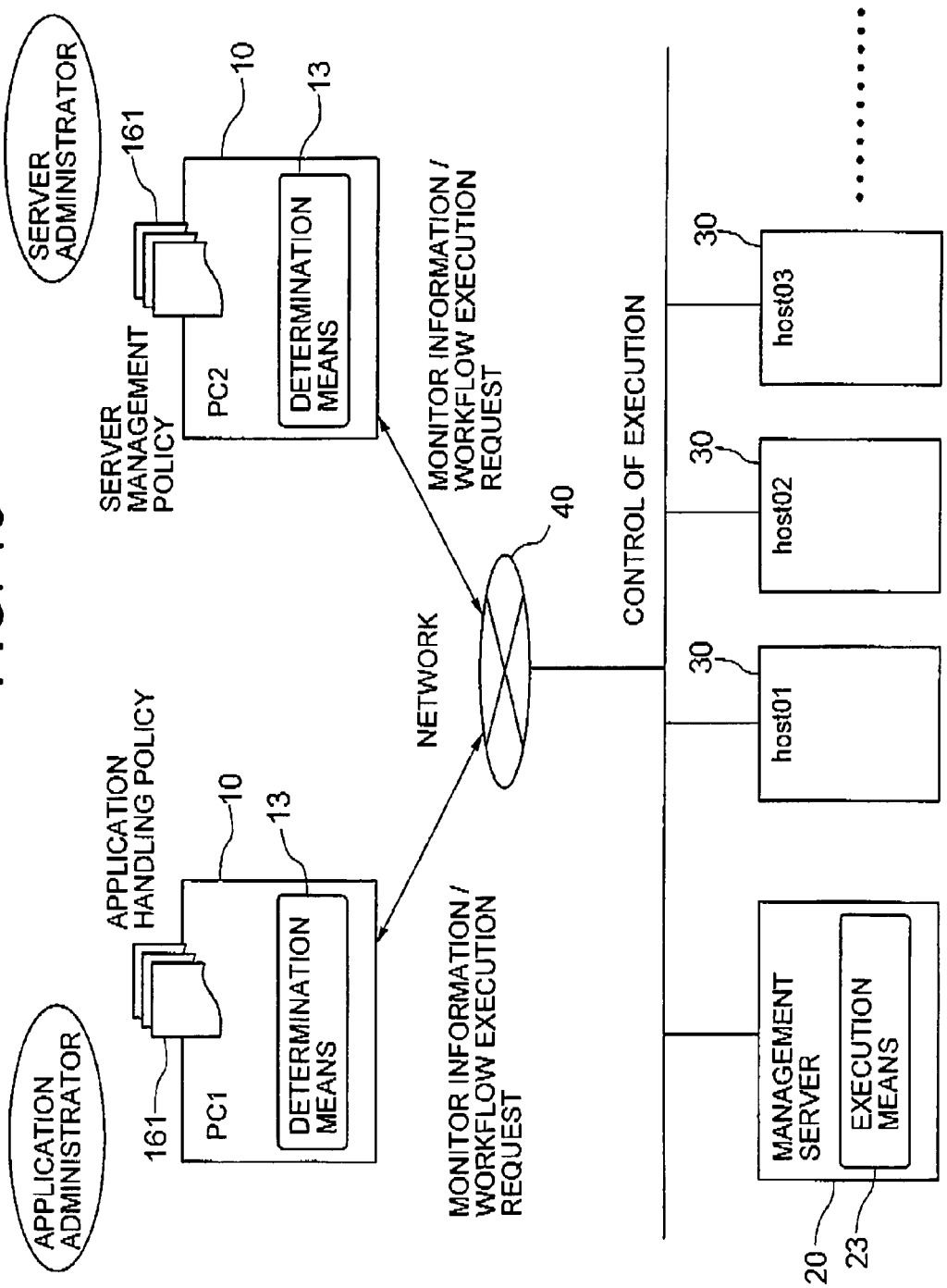
FIG. 13 is a block diagram showing a specific example of the autonomous handling management system according to the first embodiment of the present invention.

Next, a concrete example of the first embodiment according to the present invention will be described with reference to the drawings. FIG. 13 shows a state in which an application handler who operates an application on a computer system and a server administrator who is in charge of management of a server respectively use computers PC1 (10) and PC2 (10), to carry out management work in a remote mode. Determination means 13 are respectively loaded in the computers PC1 and PC2, to autonomously continue the handling management on the basis of handling management policies which the respective administrators have. Monitor information acquisition requests and workflow execution requests which are issued by the determination means 13 of the respective computers PC1 and PC2 are delivered to a management server 20 as another computer. The management server 20 is provided with execution means 23 to interpret and execute content of requests from the determination means 13. The execution means 23 issues control commands to a host 01 (30), host 02 (30, and host 03 (30) as control targets via a network 40, and collects configuration information and performance information from these hosts 30. Autonomous control managements are respectively carried out by the determination means 13 working on the computer 10 of each administrator, and by the execution means 23 working on the management server 20.

In this state, the application handler has activated the application on the host 03 and registered a policy to perform control so as to improve usability of the application when a load to the server is light. According to this policy, for example, the number of threads which are executed simultaneously is increased when the load to the server is light. The application handler has also registered another policy to limit operation of the application when the load to the server is heavy, inversely. According to this policy, for example, the number of threads which are executed simultaneously is reduced when the load to the server is heavy.

On the other hand, the server administrator carries out maintenance of several servers 30 including the host 03, and has registered a policy to detect an abnormality which may affect operation of each server 30 and to provide a countermeasure. According to this policy, for example, an application is let restart if resources are wasted by the application.

When the autonomous handling management is performed according to policies as described above, a conventional autonomous handling management system incurs a problem as follows. First, it is assumed here that the determination means 13 of the application handler performs a control to autonomously improve usability of the application. This setting is temporary setting information which is not written as a file. Suppose, however, that this setting change causes an application load to increase abruptly. Then, the determination means 13 of the application handler detects an increase of the load at any time instant, and starts up a processing for changing the setting back to an original setting. At the same time, the determination means 13 of the server administrator detects information of the load. Therefore, there is a possibility that the determination means 13 of the server administrator executes a restart processing for restarting the application.

Which request reaches the execution means 23 of the management server 20 first cannot be estimated beforehand. If the restart processing of the determination means 13 of the server administrator is executed first, the application returns to an initial state, and the load becomes low. If a setting change request from the determination means 13 of the application handler is executed later, this processing itself ends without problems, and handling is started as usual.

Hence, a problem arises in that each one of the determination means 13 of the application handler and the determination means 13 of the server administrator does not know what control is performed by the other one. The determination means 13 of the application handler does not grasp that a load to the server has decreased because of a restart. The determination means 13 of the server administrator therefore does not grasp that increase of the application load is caused by an automatic setting change of the application. Consequently, this series of controls can be repeatedly executed for a plurality of times. Under ordinary circumstances, the parameters utilized for the setting change of the application need to be reconsidered. However, there is a difficulty in grasping such a phenomenon occurring as described above because of both autonomous control functions which work properly in accordance with handling management policies. This is merely one of simple examples. Such an unintended autonomous control sequence can usually exist, caused by a fact that one determination means cannot grasp a control of another determination means.

The autonomous handling management system according to the above example eliminates the foregoing problem through an operation as follows. Both of a setting change of an application and a restart request for an application reach a request processing section (234, FIG. 3) of the execution means 23 in the management server 20. The request processing section 234 develops these workflow execution requests into detailed control procedures, and inputs the control procedures to the request execution section 235.

The request execution section 235 then notifies the stop determination section 233 of starting execution of a request. The stop determination section 233 searches for a stop determination rule from content of the request, and starts up a monitor task. The monitor task continuously checks a state of a request processing which is notified from the request execution section 235, and monitor information obtained through the information collection means 232.

Figure 14:
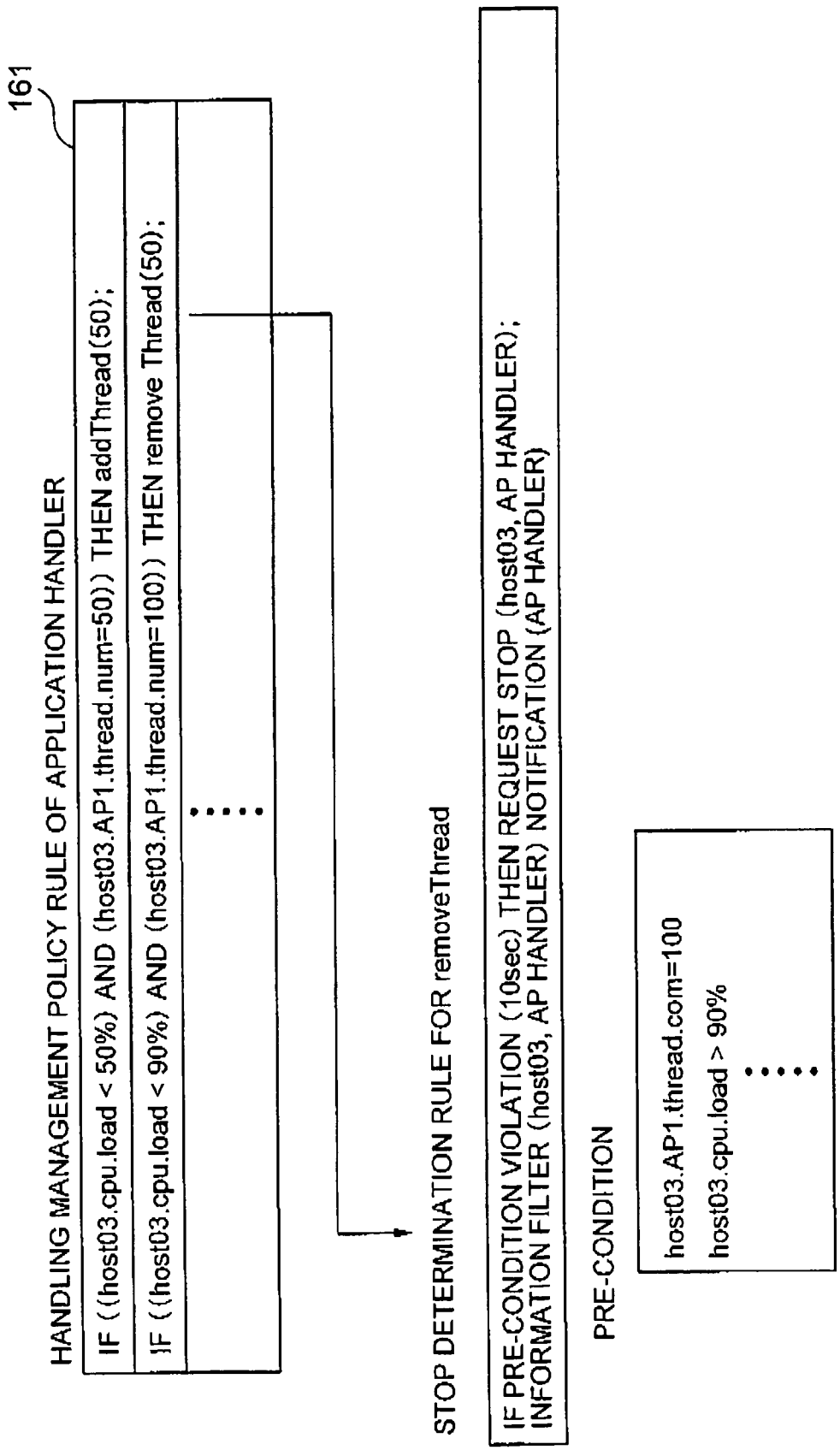
FIG. 14 is a table showing an example of the handling management policy rule and stop determination rule in the handling management system in FIG. 13.

FIG. 14 shows a handling management policy 161 of an application handling administrator, and a pre-condition and a stop determination rule which correspond to a "removeTheread" processing. The "removeTheread" is a setting change processing aiming for reduction of the application load. The pre-condition describes a condition which is the same condition as that of the determination section of the handling management policy 161, i.e., a CPU load of the server host 03 is 90% or more and the number of current threads is limited to 100.

In a circumstance that only the application handler carries out system management, violation to a pre-condition hardly occurs. However, if there is a possibility that management by another administrator such as a server administrator mediates, satisfaction of a pre-condition is not guaranteed during execution. The stop determination rule corresponding to the "removeTheread" processing defines as follows. If any item of the pre-condition is violated, provision of information of the host 03 to the determination means 13 of the application handler is limited, control of the host 03 is limited, and a notification is issued to the application handler. If an application restart processing is executed by the determination means 13 of the server administrator before the "removeTheread" processing is executed, the setting of the number of threads of the application returns to an initial state, so that the problem of loads is eliminated. Hence, it can be understood that the pre-condition is not satisfied. Accordingly, a stop processing based on the stop determination rule is carried out, to thereby limit control of the host 03 by the determination means 13 by the application handler. By a notification to the application handler, the application handler is notified of that any external factor has involved a state different from the intended state. The application handler then solves the problem. After correcting the policy or the like, the application handler releases the stop setting for the execution means 23, thereby to restart autonomous control. Until a recovery, only the host 03 falls out of targets for autonomous control, and the other automated usual works are continuously executed.

Figure 15:
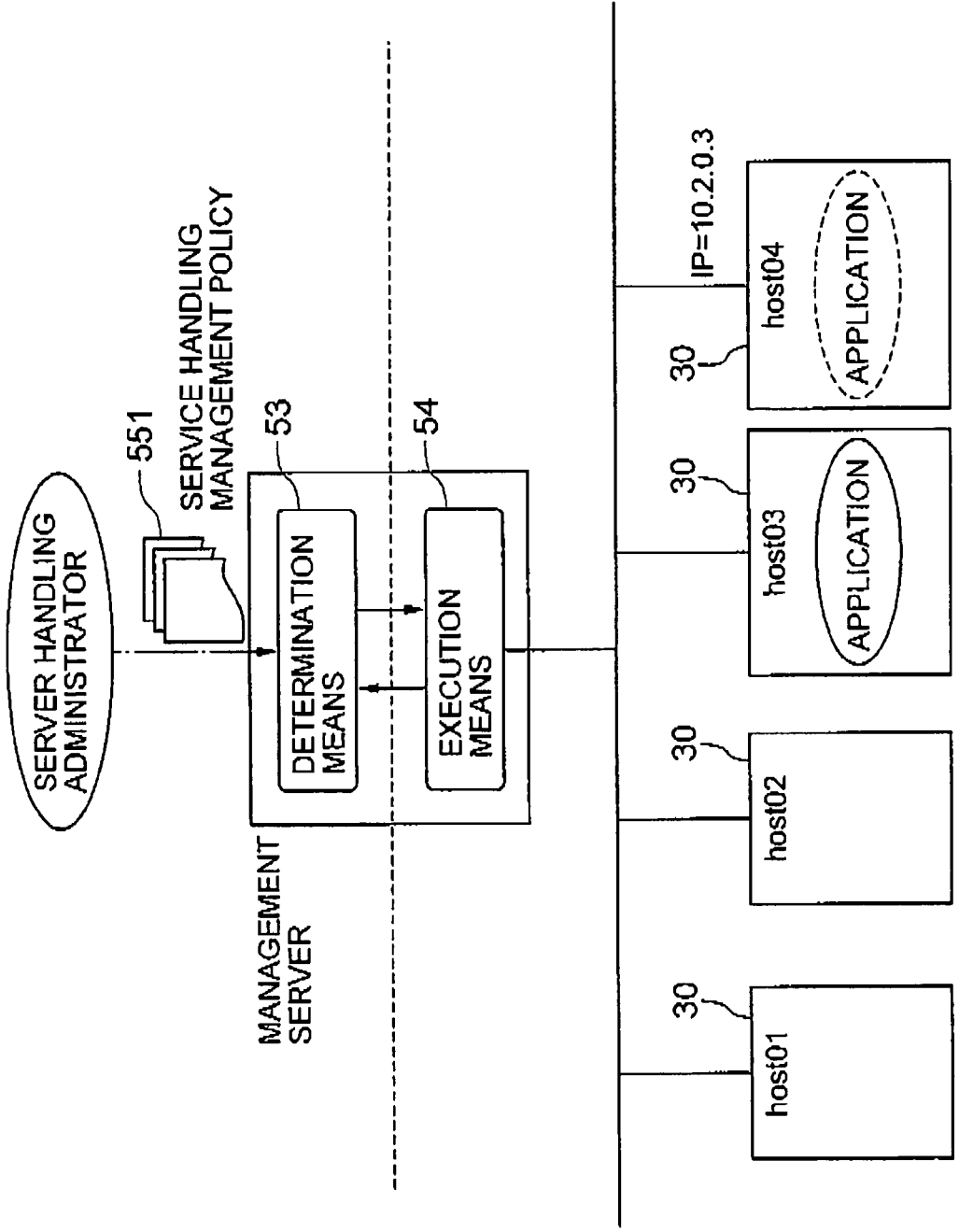
FIG. 15 is a block diagram showing a specific example of the autonomous handling management system according to the second embodiment of the present invention.

Described next will be a concrete example of an autonomous handling management system according to the second embodiment of the present invention. FIG. 15 shows the concrete example and shows a situation that a service handling administrator who operates a service by using an application working on a system carries out system management through a management server 50. The management server 50 is loaded with determination means 53 and execution means 54. The service handling administrator has registered a service handling management policy 551 related with the determination means 53. The service handling management policy 551 falls within a range in which the policy 551 can be controlled by virtualized information.

For example, it is assumed here that a handling administrator of a service has prepared a policy which adds/deletes servers in accordance with increase/decrease of a load applied to servers 30 as targets of load-distribution, in order to improve usability of the service. FIG. 16 shows an example of a handling management policy 552 for adding/deleting servers. The application load is not expressed as specific numerical data, such as a CPU usage rate or a number of clients, but is expressed in an abstract way like the application load. For example, a control command which commands addition/deletion of a server is expressed as "addHost" or "removeHost". The policy does not describe information showing which server 30 is added or what procedure is taken to add a server 30. By virtualizing the information, descriptions of the policy can be simplified so that burdens to the service handling administrator are reduced. However, when autonomous handling management is carried out according to a policy as described above, a conventional autonomous handling management system can cause a problem as follows. In the handling management policy, the handling administrator of a service expects, from calling "addHost", that a server as a load distribution target of an application is newly allocated and reduces the application load.

Suppose, meanwhile, that a control program includes a bug when interpreting and executing "addHost" by the execution means 54, in the conventional autonomous handling management system. Suppose further that an expected result is not obtained although the program itself ends normally. Then, the determination means 53 cannot cope with this mismatching. If the handling management policy 551 shown in FIG. 16 starts up "addhost" and the application load stays "high" even after normal completion of a workflow, the control according to this policy is repeatedly carried out for several times. If the application load actually is continuously "high", this operation is proper. However, in case of a bug in the control program, the problem is to be specified and debagging needs to be carried out.

However, since the policy control by the determination means 53 operates normally, the situation as described above is difficult to find out. This is mere one of simple examples. There can be usually an unintended autonomous control sequence caused by virtualizing, abstracting, and summarizing a control program or monitor information.

In the above example, the problem as described above is eliminated by operation as follows. According to the handling management policy 551 as shown in FIG. 16, a workflow execution request of "addHost" to be started up reaches the request processing section (234, FIG. 3) of the execution means 54. The request processing section 234 develops the workflow execution request into a detailed control procedure, and delivers the detailed control procedure to the request execution section 235. Then, the request execution section 235 notifies the stop determination section 233 of starting execution of the request. The stop determination section 233 searches for a stop determination rule from content of the request, and starts up a monitor task. The monitor task continuously checks the state of a request processing which is notified by the request execution section 235, and monitor information obtained through the information collection section 232.

Figure 17:
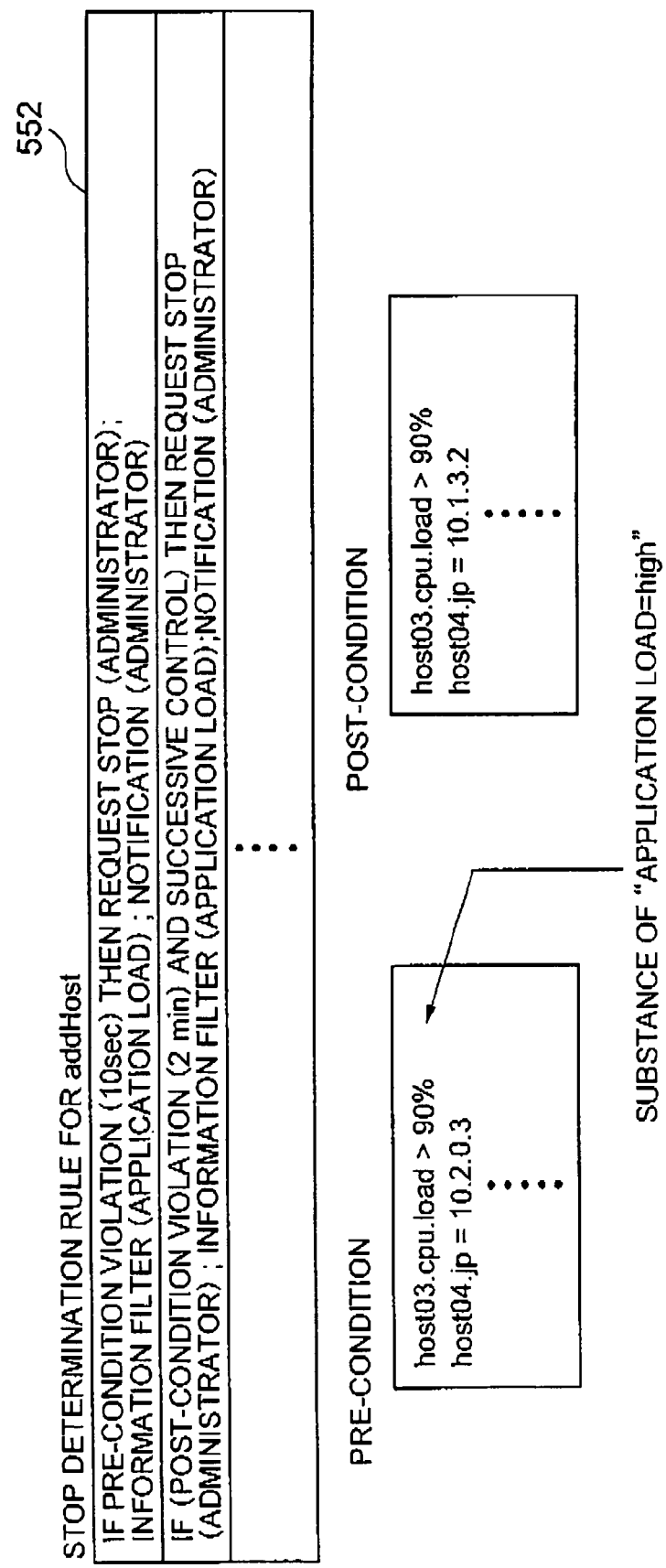
FIG. 17 is a table showing an example of the stop determination rule in the autonomous handling management system in FIG. 15.

FIG. 17 shows a stop determination rule when adding a load-distribution target server 30. Since the stop determination rule is checked by the execution means 54, specific restriction conditions are provided with respect to information which is not abstracted or summarized, unlike descriptions of a policy. The figure shows a case that the substance of an application load which appears in a description of a policy is a CPU usage rate of the host 03. When the CPU usage rate of the host 03 is 90% or more, the execution means 54 notifies the determination means 53 that the application load is "high".

The execution means 54 grasps that a state of the application load being high complies with the CPU usage rate of the host 03 being 90% or more. Therefore, a restriction to the CPU usage rate of the host 03 is added to the pre-condition and the post-condition. In addition, as an effect of "addHost", the IP address of the host 04 is changed from 10.2.0.3 to 10.1.3.2. Hence, the effect of "addHost" can also be added to the pre-condition and the post-condition. The above-described information can be automatically generated through a process of developing a control program, and if necessary, a human manually adds and sets conditions.

Even a bug in the control program can cause the program to end normally. However, in some cases, settings cannot immediately be updated due to cash information which the system includes. Therefore, if the IP address of the host 04 is not updated, a post-condition is violated. Accordingly, the request processing section 234 stops a response to a request from the determination means 53, and does not notify the determination means 53 of information of the application load. In this manner, control by the determination means 53 is restricted.

There is also a case that addition of the host 04 is found out to be impossible when a program is actually expanded for a processing of changing an IP address in the execution means 54 even if addition of the host 04 has been determined to be possible from abstracted and summarized information and "addhost" has been requested. In this case, a post-condition is violated. Accordingly, the request processing section 234 stops a response to the request from the determination means 53, and does not notify the determination means 53 of information of the application load. In this manner, control by the determination means 53 is restricted and stopped. After stopping the control, the service handling administrator carries out an inspection about matching between the handling management policy 551 and a control program to be started up by the policy, to ascertain the problem, improve descriptions of the policy, and debug the control program.

The present invention has been described heretofore based on preferred embodiments thereof. The autonomous handling management system and method thereof according to the present invention are not limited to configurations as described above. Various modifications and alterations made to the configurations of the above embodiments will fall within the scope of the present invention.

INDUSTRIAL APPLICABILITY

The present invention is applicable to autonomous handling management middleware for managing a data center and an enterprise system. Further, the invention can be also used as a debug tool for such middleware.

The invention claimed is:

1. An autonomous handling management system that autonomously handles and manages a plurality of computers connected via a network, comprising:
information collection means that collects monitor information of a control target in said system;
control determination means that autonomously determines a control based on said monitor information collected by said information collection means and a handling management policy stored in a storage unit;
control execution means that executes a control of the control target based on a control request from said control determination means; and
stop determination means that determines whether or not an autonomous control is to be stopped, based on at least one of an execution state of said control executed by said control execution means and said monitor information collected by said information collection means, and based on said stop condition stored in said storage unit, wherein:
said stop determination means, upon determining stop of said autonomous control, limits at least one of a control execution function of said control execution means and said monitor information to be supplied to said control determination means.

2. The autonomous management system according to claim 1, wherein said stop condition includes a restriction on at least one of information which cannot be described in said handling management policy and is kept secret, and setting information which depends on a device in said system.

3. The autonomous handling management system according to claim 1, wherein said stop condition includes a case that an execution effect of a control script supposed by said handling management policy differs from an actual execution effect.

4. The autonomous handling management system according to claim 1, wherein said stop determination mean, upon determining stop of said autonomous control, stops supply of all monitor information to be supplied from said information collection means to said control determination means.

5. The autonomous handling management system according to claim 1, wherein said stop determination means, upon determining step of said autonomous control, stops supply of a part of said monitor information to be supplied from said information collection means to said control determination means.

6. The autonomous handling management system according to claim 1, wherein said stop determination means, upon determining stop of said autonomous control, allows said monitor information to be supplied from said information collection means to said control determination means, while adding information indicating a target for stop to said monitor information.

7. The autonomous handling management system according to claim 1, wherein at least a part of said stop determination means is configured by a monitor task which is started depending on an execution sate of a workflow.

8. The autonomous handling management system according to claim 1, wherein said control execution means, upon executing a workflow of said control based on said monitor information, checks, prior to execution of said workflow, that at least one of a pre-condition defined for said workflow and a determination condition when said control was determined based on said handling management policy is satisfied.

9. The autonomous handling management system according to claim 1, wherein said execution means determines, after executing a workflow of said control based on said monitor information, whether or not a post-condition defined by said workflow is satisfied.

10. An autonomous handling management method for autonomously handling and managing a system including a plurality of computers connected via a network, said method comprising the steps of:
executing a workflow of a control in a control execution means based on monitor information obtained by a monitor device of said system and a handling management policy stored in a storage unit;
upon executing said workflow of said control, detecting in said control execution means whether or not a stop condition is satisfied based on said monitor information and a stop determination rule which is stored in a storage unit; and
upon detecting satisfaction of said stop condition, limiting in said control execution means at least one of a control execution function executed by said control execution means and said monitor information to be supplied from said monitor device to said control execution means.

11. The autonomous handling management method according to claim 10, wherein said stop condition includes a case that an execution effect of a control script supposed by said handling management policy differs from an actual execution effect.

12. The autonomous handling management method according to claim 10, wherein, upon detecting satisfaction of said stop condition, said monitor device stops supply of all information from said monitor device to said control execution means.

13. The autonomous handling management method according to claim 10, wherein, upon detecting satisfaction of said stop condition, said monitor device stops supply of a part of information from said monitor device to said control execution means.

14. The autonomous handling management method according to claim 10, wherein, upon detecting satisfaction of said stop condition, said monitor device adds, to information to be supplied to said control execution means, information of a target for stop and supplies the same.

15. The autonomous handling management method according to claim 10, wherein said stop condition detecting step is configured by a monitor task which is started depending on an execution state of said workflow.

16. The autonomous handling management method according to claim 10, wherein, prior to step of executing said workflow, said control execution means checks that at least one of a pre-condition defined for said workflow and a determination condition when said control was determined based on said handling management policy is satisfied.

17. The autonomous handling management method according to claim 10, wherein, upon detecting satisfaction of said stop condition, said control execution means issues an alarm to a system administrator.

18. A non-transitory computer storage medium encoded with a computer program, said computer program conning on a control computer which autonomously handles and manages a system including a plurality of computers connected via a network, said program defining the steps of:
   executing a workflow of a control based on monitor information obtained by a monitor device of said system and a handling management policy stored in a storage unit;
   upon executing said workflow of said control, detecting whether or not a stop condition is satisfied based on said monitor information and a stop determination rule which is stored in a storage unit and describes said stop condition for determining a stop of an autonomous control of a control target; and
   upon detecting satisfaction of said stop condition, liming at least one of an execution function of said workflow of said control and said monitor information to be supplied from said monitor device during said processing of executing said workflow of said control.

19. The non-transitory computer storage medium according to claim 18, wherein said stop condition includes a case that an execution effect of a control script supposed by said handling management policy differs from an actual execution effect.

20. The non-transitory computer storage medium program according to claim 18, further defining the step of, upon detecting satisfaction of said stop condition, stopping supply of all monitor information from said monitor device to said control execution means.

21. The non-transitory computer storage program according to claim 18, further defining the step, upon detecting satisfaction of said stop condition, the processing of stopping supply of a part of said monitor information from said monitor device to said control execution means.

22. The non-transitory computer storage program according to claim 18, further defining the step of, upon detecting satisfaction of said stop condition, adding, to information to be supplied to said control execution means, information of a target for stop and supplies the same.

23. The non-transitory computer storage program according to claim 18, wherein said stop condition detecting step is implemented by a monitor task program started depending on an execution state of said workflow.

24. The non-transitory computer storage program according to claim 18, further defining the step of, prior to said executing of said workflow of said control, checking that at least one of a pre-condition defined for said workflow and a determination condition when said control was determined based on said handling management policy is satisfied.

25. The non-transitory computer storage program according to claim 18, further defining the step of, upon satisfaction of said stop condition, issuing an alarm a system administrator.

* * * * *